US012571414B2

(12) United States Patent
Almarza et al.

(10) Patent No.: US 12,571,414 B2
(45) Date of Patent: Mar. 10, 2026

(54) RETAINER FOR SECURING COMPONENT TO STRUCTURE

(71) Applicant: Ford Motor Company, Dearborn, MI (US)

(72) Inventors: Fernando Almarza, Atizapán de Zaragoza (MX); Eunice Peraza, Mexico City (MX); Jaime Romo, Mexico City (MX); Valente Perez, Mexico City (MX)

(73) Assignee: Ford Motor Company, Dearborn, MI (US)

( * ) Notice: Subject to any disclaimer, the term of this patent is extended or adjusted under 35 U.S.C. 154(b) by 406 days.

(21) Appl. No.: 18/171,082

(22) Filed: Feb. 17, 2023

(65) Prior Publication Data

US 2024/0280125 A1 Aug. 22, 2024

(51) Int. Cl.
F16B 2/22 (2006.01)

(52) U.S. Cl.
CPC ...................................... F16B 2/22 (2013.01)

(58) Field of Classification Search
CPC ......................................................... F16B 2/22
See application file for complete search history.

(56) References Cited

U.S. PATENT DOCUMENTS

| | | | | |
|---|---|---|---|---|
| 6,196,751 B1 * | 3/2001 | Khokhar | ............. | B60R 16/0215 |
| | | | | 24/17 AP |
| 6,364,257 B1 * | 4/2002 | Holder | .................... | F16L 3/237 |
| | | | | 248/74.1 |
| 6,533,226 B2 * | 3/2003 | Geiger | .................... | F16L 3/237 |
| | | | | 248/68.1 |
| 9,004,417 B2 * | 4/2015 | Elsner | ...................... | H02G 3/32 |
| | | | | 248/74.1 |
| 9,067,717 B2 * | 6/2015 | DeMik | .................... | F16L 3/221 |
| 9,689,511 B1 * | 6/2017 | Thornton | ................. | H02G 3/30 |
| 10,316,991 B2 * | 6/2019 | Gallion | .................... | F16L 3/24 |
| 10,663,089 B2 * | 5/2020 | Sylvester | ................ | F16L 3/137 |
| 11,209,030 B2 * | 12/2021 | Vaughn | ..................... | F16B 2/16 |
| 11,420,571 B1 * | 8/2022 | Spearing | ................. | F16B 37/02 |
| 12,161,896 B2 * | 12/2024 | Cherdo | ............. | A62B 35/0037 |

(Continued)

FOREIGN PATENT DOCUMENTS

| | | |
|---|---|---|
| CN | 102677407 | 12/2013 |
| DE | 202007000938 | 5/2007 |

(Continued)

*Primary Examiner* — Kimberly T Wood
(74) *Attorney, Agent, or Firm* — Burris Law, PLLC

(57) ABSTRACT

A retainer that includes a body portion. The body portion defines a first aperture open through a first side of the body portion, a second aperture open through a second side of the body portion, a third aperture open through a third side of the body portion, and a fourth aperture open through a fourth side of the body portion. The first aperture is in communication with the second aperture to define a first pathway through the body portion in which a strap is receivable. The third aperture is in communication with the fourth aperture within the body portion to define a second pathway through the body portion in which the strap is receivable. The body portion defines a fifth aperture and a sixth aperture in communication with the fifth aperture within the body portion to define a third pathway through the body portion in which the strap is receivable.

19 Claims, 6 Drawing Sheets

(56)　　　　　References Cited

U.S. PATENT DOCUMENTS

| | | | |
|---|---|---|---|
| 2013/0092803 A1 | 4/2013 | Fujiwara | |
| 2015/0211565 A1* | 7/2015 | Benedetti .............. | F16B 21/075 |
| | | | 24/292 |
| 2019/0293103 A1* | 9/2019 | Isaji ........................ | F16B 5/123 |

FOREIGN PATENT DOCUMENTS

| | | |
|---|---|---|
| EP | 0713225 | 5/1996 |
| KR | 1020160002869 | 8/2016 |
| KR | 1020170059845 | 5/2017 |

\* cited by examiner

RETAINER FOR SECURING COMPONENT TO STRUCTURE

FIELD

The present disclosure relates to a retainer for securing a vehicle component to a structure.

BACKGROUND

The statements in this section merely provide background information related to the present disclosure and may not constitute prior art.

Retainers may be used to secure components (e.g., wire bundles, fluid lines) to structures of vehicles. In many instances, each retainer is configured for a specific application where the retainer secures a component to a predetermined location of the vehicle. In this way, the vehicle may include a plurality of retainers of different design used to secure components to different locations of the vehicle, which increases tooling cost and manufacturing cost of the retainers. Additionally, different vehicles may use retainers of different designs, which further leads to increase tooling and manufacturing cost.

The teachings of the present disclosure address these and other issues with retainers used to secure components to structures of vehicles.

SUMMARY

This section provides a general summary of the disclosure and is not a comprehensive disclosure of its full scope or all of its features.

In one form, the present disclosure provides a retainer for securing an article to an edge of a structure. The retainer includes a body portion and a gripper. The body portion defines a first aperture open through a first side of the body portion, a second aperture open through a second side of the body portion, a third aperture open through a third side of the body portion, and a fourth aperture open through a fourth side of the body portion. The first aperture is in communication with the second aperture within the body portion to define a first pathway through the body portion in which a strap is receivable in a first orientation. The third aperture is in communication with the fourth aperture within the body portion to define a second pathway through the body portion in which the strap is receivable in a second orientation. The first pathway and the second pathway are transverse to each other. The body portion further defines a fifth aperture and a sixth aperture in communication with the fifth aperture within the body portion to define a third pathway through the body portion in which the strap is receivable in a third orientation. The gripper includes a first leg and a second leg. A proximal portion of the first leg and a proximal portion of the second leg being fixed to the body portion. The first and second legs being spaced apart such that the first and second legs cooperate to define a channel. The channel being open through an end of the gripper to receive the edge of the structure.

In variations of the retainer of the above paragraph, which can be implemented individually or in any combination: the body portion defines an interior cavity through which the first, second, and third pathways extend; the first, second, and third pathways are transverse to each other; the body portion includes at least seven sides; the third pathway is substantially parallel to the first pathway and the second pathway is transverse to the first pathway; the second pathway extends in a second direction, and the third pathway extends in a third direction, the first, second, and third directions are substantially perpendicular to each other; a distance between a distal portion of the first leg and a distal portion of the second leg increases such that the channel widens toward the end of the gripper; the first, second, third, fourth, fifth, and sixth apertures are each rectangular in shape; further comprising the strap; the body portion has an L-shape; and further comprising an insert located within the channel and secured to the first and second legs, the insert configured to grip the edge of the structure.

In another form, the present disclosure provides a retainer for securing an article to an edge of a structure. The retainer includes a body and a gripper. The body includes a first body portion and a second body portion. The first body portion includes a first aperture open through a first side of the first body portion, a second aperture open through a second side of the first body portion that is opposite the first side, a third aperture open through a third side of the first body portion, and a fourth aperture open through a fourth side of the first body portion that is opposite the third side. The first aperture is in communication with the second aperture to define a first pathway through the first body portion in which a strap is receivable in a first orientation. The third aperture is in communication with the fourth aperture to define a second pathway through the first body portion in which the strap is receivable in a second orientation. The second body portion extends perpendicular to the first body portion. The second body portion includes a fifth aperture open through a fifth side of the second body portion and a sixth aperture open through a sixth side of the second body portion that is opposite the fifth side. The fifth aperture is in communication with the sixth aperture to define a third pathway through the second body portion in which the strap is receivable in a third orientation. The gripper includes a first leg and a second leg. A proximal portion of the first leg and a proximal portion of the second leg being fixed to the body portion. The first and second legs being spaced apart and extending in a first direction from the body portion such that the first and second legs cooperate to define a channel. The channel being open through an end of the gripper to receive the edge of the structure. The first pathway extends in the first direction, the second pathway extends in a second direction, and the third pathway extends in a third direction. The first, second, and third directions are substantially perpendicular to each other.

In variations of the retainer of the above paragraph, which can be implemented individually or in any combination: the body defines an interior cavity through which the first, second, and third pathways extend; the first body portion includes a seventh aperture and an eight aperture in communication with the seventh aperture to define a fourth pathway; the fourth pathway extends in the third direction; the first body portion includes a seventh aperture open through the first side and the second body portion includes an eight aperture open through a seventh side, the eight aperture in communication with the seventh aperture to define a fourth pathway, the fourth pathway extends in the first direction; the first, second, third, fourth, fifth, and sixth apertures are each rectangular in shape; further comprising an insert located within the channel and secured to the first and second legs, the insert configured to grip the edge of the structure; the body and the gripper are made of a plastic material and the insert is made of a metal material; and further comprising the strap.

In yet another form, the present disclosure provides a retainer for securing an article to an edge of a structure. The retainer includes an L-shaped body portion, a gripper, and an insert. The L-shaped body portion defines an interior cavity and includes a first side, a second side, a third side, a fourth side, a fifth side, a sixth side, a seventh side, and an eight side. A plurality of pathways are formed in the body portion and are configured to receive a strap for securing the article to the edge of the structure. The plurality of pathways include: a first pathway extending in a first direction, the first pathway defining a first aperture open through the first side and a second aperture open through the second side and in communication with the first aperture; a second pathway extending in the first direction, the second pathway defining a third aperture open through the first side and a fourth aperture open through the third side and in communication with the third aperture; a third pathway extending in a second direction that is substantially perpendicular to the first direction, the third pathway defining a fifth aperture open through the fourth side and a sixth aperture open through the fifth side and in communication with the fifth aperture; a fourth pathway extending in a third direction that is substantially perpendicular to the first and second directions, the fourth pathway defining a seventh aperture open through the sixth side and an eighth aperture open through the seventh side and in communication with the seventh aperture; and a fifth pathway extending in the third direction and defining a ninth aperture open through the sixth side and a tenth aperture open through the seventh side and in communication with the ninth aperture. The gripper includes a first leg and a second leg. A proximal portion of the first leg and a proximal portion of the second leg are fixed to the second side of the body portion. The first and second legs are spaced apart and extend in a first direction from the body portion such that the first and second legs cooperate to define a channel. The channel is open through an end of the gripper to receive the edge of the structure. The insert is located within the channel and is secured to the first and second legs. The insert is configured to grip the edge of the structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
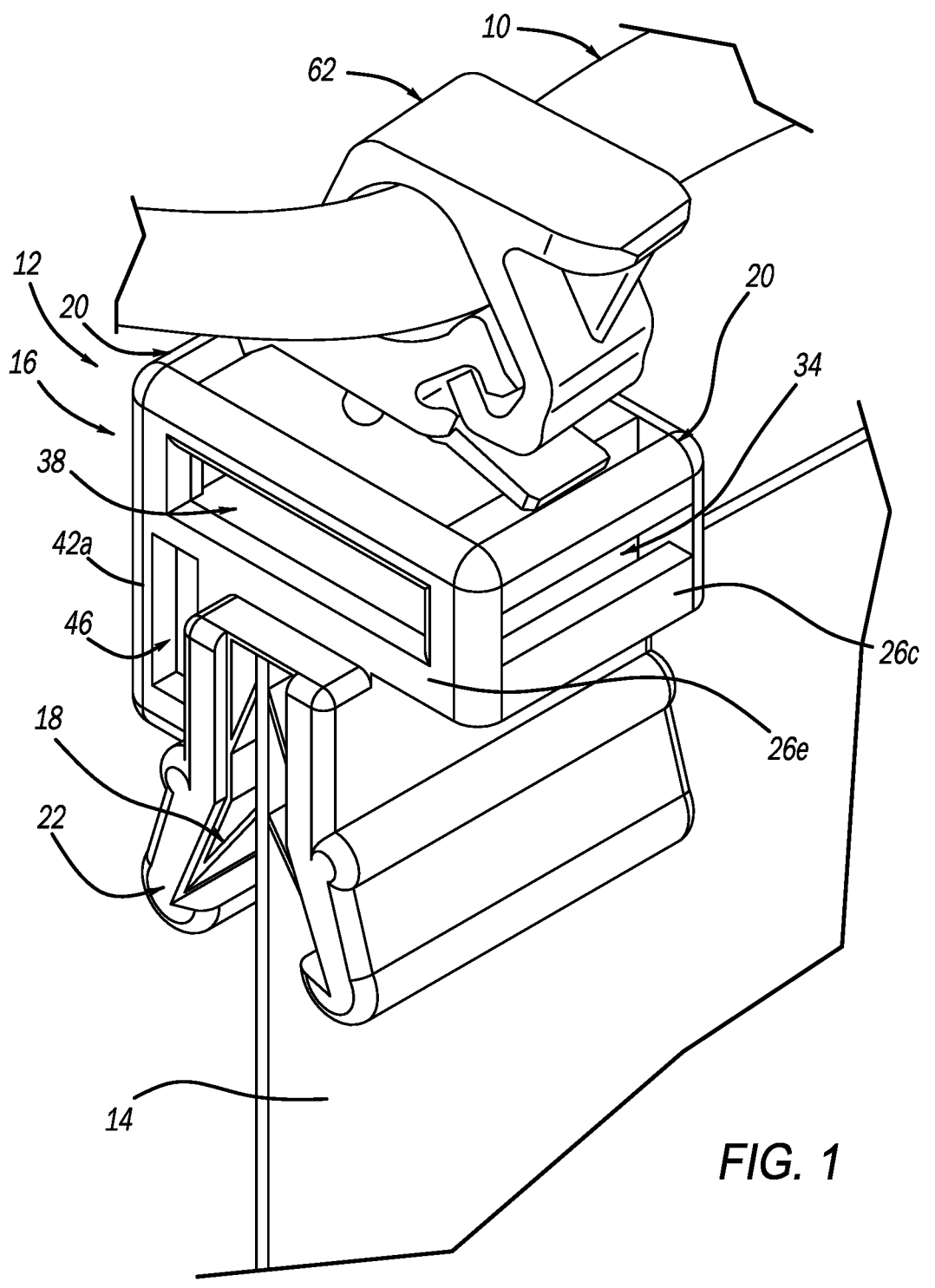
FIG. 1 is a perspective view of a retainer secured to a structure in accordance with the principles of the present disclosure.

The drawings described herein are for illustration purposes only and are not intended to limit the scope of the present disclosure in any way.

4

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-4, a vehicle component 10 (FIG. 1; e.g., a wire bundle) is secured to a retainer 12, which is, in turn, secured to a vehicle. In this way, the retainer 12 secures the vehicle component or article 10 relative to the vehicle. In the example illustrated, the retainer 12 may be secured to a structure 14 of the vehicle (e.g., the retainer 12 may be secured to a sheet metal panel, a flange, or another relatively thin flat component of the vehicle) of the vehicle. In another example, the retainer 12 may be secured to a center console of the vehicle where vehicle controls are located. As such, it should be understood that the retainer 12 may secure the vehicle component 10 relative to the vehicle at any one of a plurality of locations of the vehicle.

In the example illustrated, the retainer 12 is an assembly that includes a retaining structure 16 and an insert 18. The retaining structure 16 may be made of a plastic material, for example, and may be in the form of a unitized, monolithic body. As used herein, unitized means a unitary formed single part, i.e., single piece of material, as opposed to an assembly separately formed of attached parts. In one example, the retaining structure 16 may be formed using a molding process such as injection molding. In another example, the retaining structure 16 may be manufactured by an addictive manufacturing process, for example. The manufacturing process can include laser sintering, for example, that can generally include a laser, a means for applying subsequent layers of powdered sintering material, and a controller that controls operation of the laser and the amount and timing of the deposition of the powder. It should be understood that other 3D printing/additive manufacturing methods may be employed to achieve the unitized, monolithic body, along with a variety of different materials, while remaining within the scope of the present disclosure. In another form, the retaining structure 16 may be in the form of two or more parts secured to each other.

With additional reference to FIGS. 5-8, the retaining structure 16 includes a body 20 and a gripper 22. The body 20 has an L-shape and includes a first body portion 20a and a second body portion 20b that extends perpendicular to the first body portion 20a. The body 20 also defines an internal or interior cavity 24 (FIGS. 6-8) that is formed in the first and second body portions 20a, 20b. Stated differently, a first portion of the internal cavity 24 is formed in the first body portion 20a and a second portion of the internal cavity 24 is formed in the second body portion 20b. In this way, the internal cavity 24 extends from the first body portion 20a to the second body portion 20b.

The first body portion 20a includes a plurality of sides 26a, 26b, 26c, 26d, 26e, 26f (together referred to as sides). In the example illustrated, the sides have a flat shape. In some forms, the sides may have an arcuate shape or any other suitable shape. The side 26a (FIGS. 5-8) extends parallel to the side 26b and has a length (in the X direction) that is greater than a length (in the X direction) of the side 26b. Side 26a extends between and is adjacent to sides 26c, 26d, 26e, 26f. The side 26a and the side 26b together form a pair of opposed sides. A plurality of openings or apertures 30a, 30b (FIGS. 1, 2, and 6) open through side 26a and are communication with the first portion of the internal cavity 24. In the example illustrated, each of the openings 30a, 30b have a rectangular shape with a width in the Y direction being more than a length in the X direction. In some forms, the openings 30a, 30b may have a circular shape, an oval shape, or any other suitable shape. In the example illustrated, the opening 30a is located at or near a first end of the side 26a and the opening 30b is located at or near a second end of the side 26a that is opposite the first end. In some forms, the openings 30a, 30b may be formed in the side 26a at other locations (e.g., one or both of the openings 30a, 30b may be formed in the side 26a at a center portion).

Figure 6:
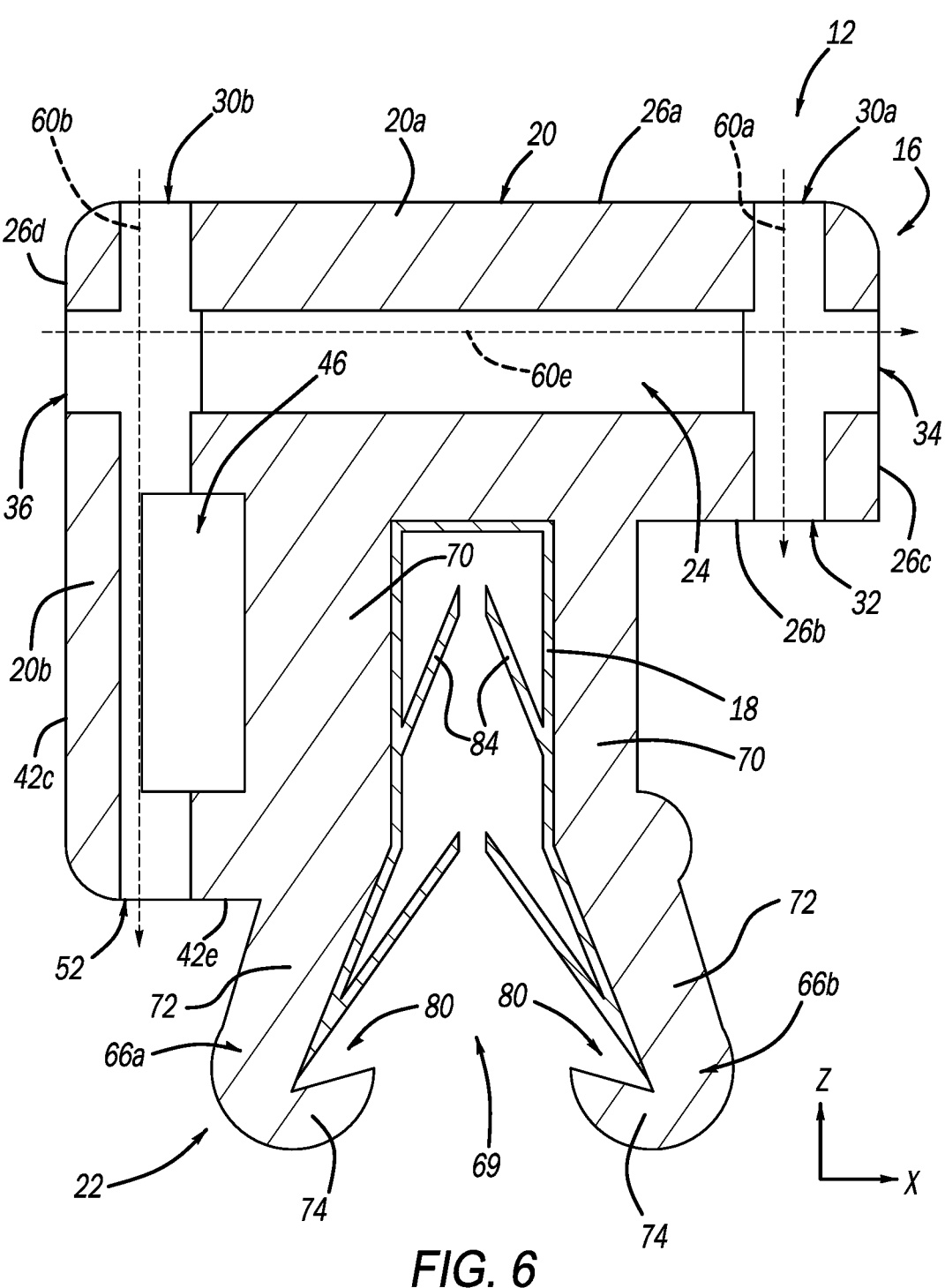
FIG. 6 is a cross-sectional view of the retainer of FIG. 1 taken along line 6-6 of FIG. 2.

Side 26b extends between and is adjacent to sides 26c, 26e, 26f. At least one opening or aperture 32 (FIGS. 4 and 6) opens through side 26b and is in communication with the first portion of the internal cavity 24. In the example illustrated, the opening 32 has a rectangular shape with a width in the Y direction being more than a length in the X direction. In some forms, the opening 32 may have a circular shape, an oval shape or any other suitable shape. In the example illustrated, the opening 32 is located at or near an end of the side 26b and is aligned with the opening 30a formed in the side 26a (FIG. 6). In some forms, when the opening 30a opens through the side 26a at a different location (e.g., in the side 26a at a center portion), the opening 32 opens through the side 26b such that the opening 32 is aligned with the opening 30a.

The side 26c extends parallel to the side 26d and extends perpendicular to the sides 26a, 26b. Side 26c extends between and is adjacent to sides 26a, 26b, 26e, 26f. The sides 26c, 26d together form a pair of opposed sides. At least one opening or aperture 34 (FIGS. 1 and 6) opens through side 26c and is in communication with the first portion of the internal cavity 24. In the example illustrated, the opening 34 has a rectangular shape with a width in the Y direction being more than a height in the Z direction. In some forms, the opening 34 may have a circular shape, an oval shape or any other suitable shape. In some forms, the opening 34 may occupy the majority of the side 26c. In other forms, the opening 34 may occupy less than half (less than 50%) of the entire side 26c.

The side 26d extends perpendicular to the sides 26a, 26b and has a length that is equal to a length of the side 26c. Side 26d extends between and is adjacent to sides 26a, 26e, 26f. At least one opening or aperture 36 (FIGS. 2, 3, and 6) opens through side 26d and is in communication with the first portion of the internal cavity 24. In the example illustrated, the opening 36 has a rectangular shape with a width in the Y direction being more than a height in the Z direction. In some forms, the opening 36 may have a circular shape, an oval shape or any other suitable shape. In the example illustrated, the opening 36 is aligned with the opening 34 formed in the side 26c. In some forms, the opening 36 may occupy the majority of the side 26d. In other forms, the opening 36 may occupy less than half (less than 50%) of the entire side 26d.

The side 26e extends parallel to the side 26f and extends perpendicular to the sides 26a, 26b, 26c, 26d. The sides 26e, 26f together form a pair of opposed sides. Side 26e extends between and is adjacent to sides 26a, 26b, 26c, 26d. At least one opening or aperture 38 (FIGS. 1-3, 5, and 8) opens through the side 26e and is in communication with the first portion of the internal cavity 24. In the example illustrated, the opening 38 has a rectangular shape with a length in the X direction being more than a height in the Z direction. In some forms, the opening 38 may have a circular shape, an oval shape, or any other suitable shape. In some forms, the opening 38 may occupy the majority of the side 26e. In other forms, the opening 38 may occupy less than half (less than 50%) of the entire side 26e.

The side 26f extends perpendicular to the sides 26a, 26b, 26c, 26d and has a length that is equal to a length of the side 26e. Side 26f extends between and is adjacent to sides 26a, 26b, 26c, 26d. At least one opening or aperture 40 (FIG. 8) opens through the side 26f and is in communication with the first portion of the internal cavity 24. In the example illustrated, the opening 40 has a rectangular shape with a length in the X direction being more than a height in the Z direction. In some forms, the opening 40 may have a circular shape, an oval shape or any other suitable shape. In the example illustrated, the opening 40 is aligned with the opening 38 formed in the side 26e. The openings 38, 40 of the sides 26e, 26f, respectively, are sized to be greater than the openings 30a, 30b, 34, 36. Stated differently, an area of each of the openings 38, 40 is greater than an area of each of the openings 30a, 30b, 34, 36. In some forms, the opening 40 may occupy the majority of the side 26f. In others forms, the opening 40 may occupy less than half (less than 50%) of the entire side 26f.

Figure 2:
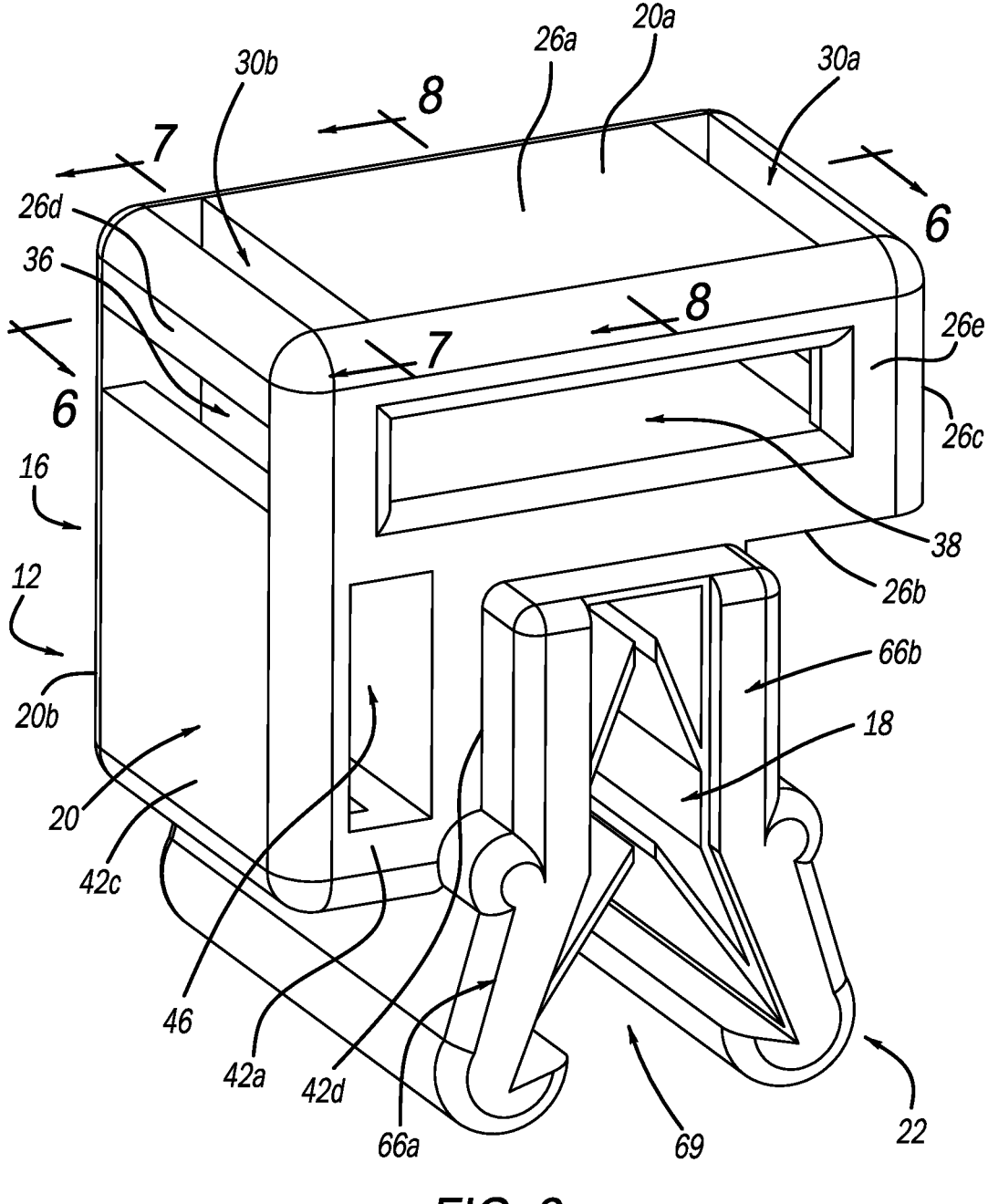
FIG. 2 is a perspective view of the retainer of FIG. 1.
Figures 4, 5:
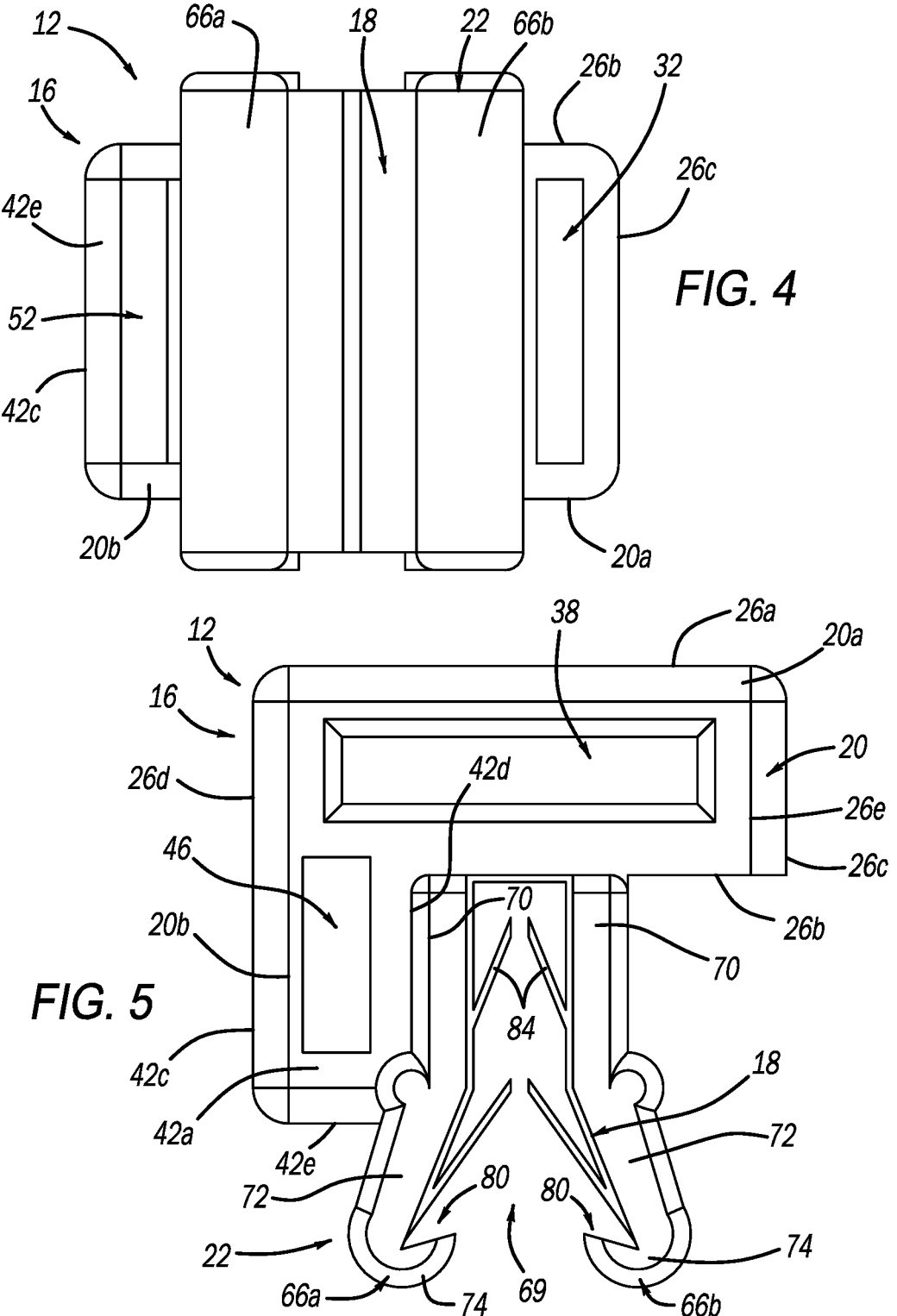
FIG. 4 is a bottom view of the retainer of FIG. 1.
FIG. 5 is a side view of the retainer of FIG. 1.

The second body portion 20b includes a plurality of sides 42a, 42b, 42c, 42d, 42e (together referred to as sides). In the example illustrated, the sides have a flat shape. In some forms, the side may have an arcuate shape or any other suitable shape. With reference to FIGS. 1, 2, and 5, the side 42a extends parallel to the sides 42b, 26e, 26f and extends perpendicular to the sides 26a, 26b, 26c, 26d. The side 42a may also be coplanar with the side 26e of the first body portion 20a, as shown. The side 42a, 42b together form a pair of opposed sides. Side 42a extends between and is adjacent to sides 42c, 42d, 42e, 26e. At least one opening or aperture 46 opens through the side 42a and is in communication with the second portion of the internal cavity 24. In the example illustrated, the opening 46 has a rectangular shape with a height in the Z direction being more than a length in the X direction. In some forms, the opening 46 may have a circular shape, an oval shape or any other suitable shape.

Figures 7, 8:
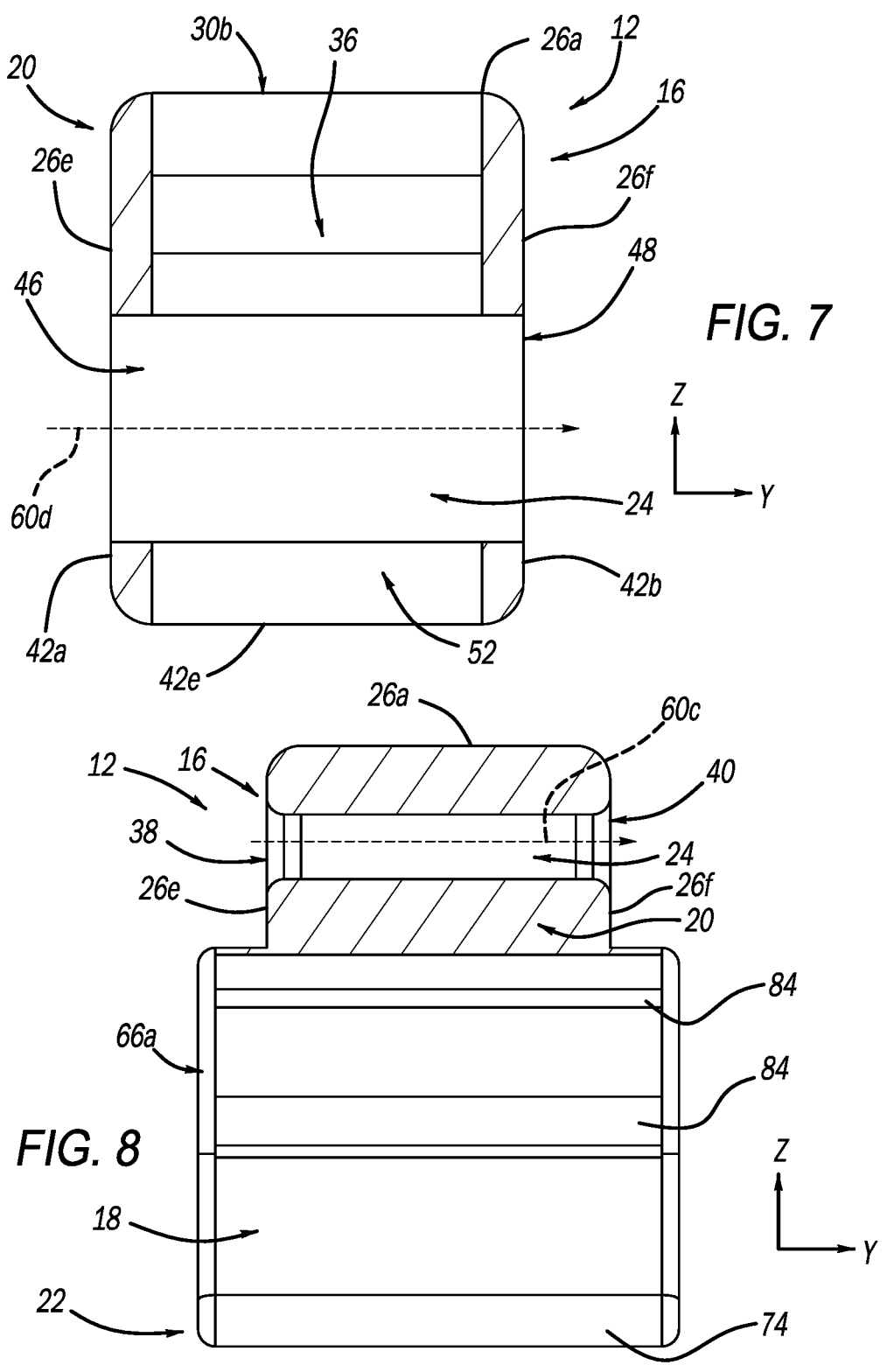
FIG. 7 is a cross-sectional view of the retainer of FIG. 1 taken along line 7-7 of FIG. 2.
FIG. 8 is a cross-sectional view of the retainer of FIG. 1 taken along line 8-8 of FIG. 2.

With reference to FIG. 7, the side 42b extends parallel to the sides 26e, 26f and extends perpendicular to the sides 26a, 26b, 26c, 26d. The side 42b may also be coplanar with the side 26f of the first body portion 20a, as shown. Side 42b extends between and is adjacent to sides 42c, 42d, 42e, 26f. At least one opening or aperture 48 opens through the side 42b and is in communication with the second portion of the internal cavity 24. In the example illustrated, the opening 48 has a rectangular shape with a height in the Z direction being more than a length in the X direction. In some forms, the opening 48 may have a circular shape, an oval shape or any other suitable shape. In the example illustrated, the opening 48 is aligned with the opening 46 formed in the side 42a (FIG. 7). In some forms, the opening 48 may occupy the majority of the side 42b. In some forms, the opening 48 may occupy less than half (less than 50%) of the entire side 42b.

With reference to FIG. 2, the side 42c extends parallel to the sides 42d, 26c, 26d and extends perpendicular to the sides 26a, 26b, 26e, 26f. The side 42c may also be coplanar with the side 26d of the first body portion, as shown. The sides 42c, 42d together form a pair of opposed sides. Side 42c extends between and is adjacent to sides 42a, 42b, 42e, 26d. The side 42d is positioned between the side 42c and the side 26c. While the example provided has the body 20 and gripper 22 being unitarily formed such that the leg extends directly from the side 42d such that the side 42d lacks a distinct or exposed surface, as used herein, the term "side 42*d*" is understood as being the plane or side that would face and abut the leg 66*a* if the body 20 and gripper 22 were to be formed separately or the plane or side that would face the leg 66*a* if the leg 66*a* were spaced apart from the side 42*d* in a configuration not specifically shown. As such, side 42*d* can be considered as extending between and adjacent to sides 42*a*, 42*b*, 42*e*. Likewise, side 26*b* is understood as continuing in the X direction to be adjacent to side 42*d* even though a portion of side 26*b* is not distinct from or is otherwise not exposed above the gripper 22.

The side 42*e* extends parallel to the sides 26*a*, 26*b* and extends perpendicular to the sides 26*c*, 26*d*, 26*e*, 26*f*. The side 26*b* is positioned between the side 26*a* and the side 42*e*. At least one opening or aperture 52 (FIGS. 4 and 6) opens through the side 42*e* and is in communication with the second portion of the internal cavity 24. In the example illustrated, the opening 52 has a rectangular shape with a width in the Y direction being more than a length in the X direction. In some forms, the opening 52 may have a circular shape, an oval shape or any other suitable shape. In the example illustrated, the opening 52 is aligned with the opening 30*b* formed in the side 26*a*. In some forms, the opening 52 may occupy the majority of the side 42*e*. In other forms, the opening 52 may occupy less than half (less than 50%) of the entire side 42*e*.

With reference to FIGS. 6-8, the body 20 also includes a plurality of passages or pathways 60*a*, 60*b*, 60*c*, 60*d*, 60*e* (together referred to as passages) configured to receive a strap or band 62 (FIG. 1) for securing the vehicle component 10 to the structure 14 of the vehicle. In one example, the band 62 may be a cable tie configured to extend through a respective passage and wrap around the vehicle component 10, thereby securing the vehicle component 10 to the structure 14. The passage 60*a* (FIG. 6) extends in a first direction Z and is formed by openings 30*a*, 32 and the first portion of the internal cavity 24. The band 62 may extend through the passage 60*a*, thereby securing the vehicle component 10 secured thereto to the structure 14. The passage 60*b* (FIG. 6) also extends in the first direction Z and is formed by openings 30*b*, 52 and the internal cavity 24. The band 62 may extend through the passage 60*b*, thereby securing the vehicle component 10 to the structure 14.

The passage 60*c* extends in a second direction Y and is formed by the openings 38, 40 (FIG. 8) and the first portion of the internal cavity 24. The second direction Y extends perpendicular to the first direction Z. The band 62 may extend through the passage 60*c*, thereby securing the vehicle component 10 to the structure 14. The passage 60*d* (FIG. 7) also extends in the second direction Y and is formed by the openings 46, 48 and the second portion of the internal cavity 24. The passage 60*d* is positioned below the passage 60*c*. The band 62 may extend through the passage 60*d*, thereby securing the vehicle component 10 to the structure 14. The passage 60*e* (FIG. 6) extends in a third direction X and is formed by the openings 34, 36 and the first portion of the internal cavity 24. The third direction X extends perpendicular to the first direction Z and perpendicular to the second direction Y. The band 62 may extend through the passage 60*e*, thereby securing the vehicle component 10 to the structure 14.

Figure 3:
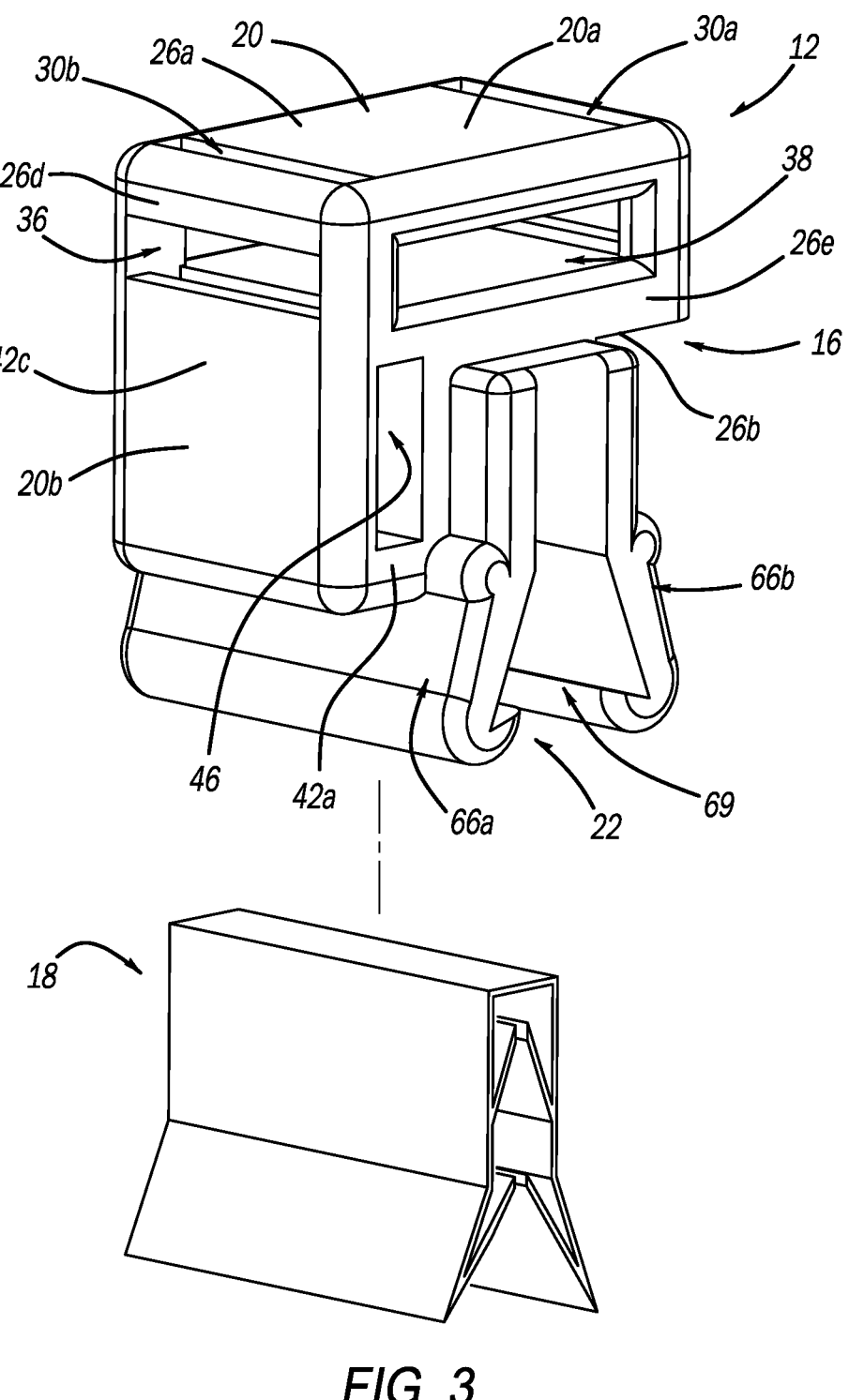
FIG. 3 is an exploded perspective view of the retainer of FIG. 1.

With reference to FIGS. 1-3, the gripper 22 is configured to grip the structure 14 of the vehicle to secure the retaining structure 16, and, in turn, the vehicle component 10 relative to the vehicle. The gripper 22 includes a pair of legs 66*a*, 66*b* that are spaced apart from each other to form a channel 69. In the example illustrated, a proximal end of the leg 66*b* extends from the side 26*b* of the first body portion 20*a* and a proximal end of the leg 66*a* extends from the side 26*b* of the first body portion 20*a* and the side 42*d* of the second body portion 20*b*. In some forms, the proximal end of the leg 66*a* may extend from only one of the sides 26*b*, 42*d* and may be spaced apart from the other of the sides 26*b*, 42*d*.

With reference to FIGS. 5 and 6, each of the legs 66*a*, 66*b* includes an attachment portion 70, a transition portion 72, and a hook portion 74. The attachment portion 70 of the leg 66*b* extends from the side 26*b* and the attachment portion 70 of the leg 66*a* extends from the side 26*b* and the side 42*d*. The attachment portions 70 of the legs 66*a*, 66*b* extend parallel to each other in the first direction Z. The transition portion 72 may extend from the attachment portion 70 to the hook portion 74. In the example illustrated, the transition portions 72 of the legs 66*a*, 66*b* extend away from each other such that a distance therebetween is wider than a distance between the attachment portions 70 of the legs 66*a*, 66*b*. In some forms, the transition portions 72 of the legs 66*a*, 66*b* may extend parallel to each other such that the distance therebetween is equal to the distance between the attachment portions 70 of the legs 66*a*, 66*b*. The hook portions 74 of the legs 66*a*, 66*b* face each other and each includes a notch 80 formed therein.

The insert 18 is secured to the legs 66*a*, 66*b* and is configured to grip a portion of the vehicle, thereby securing the retaining structure 16 to the vehicle. The insert 18 is received in the channel 69 formed by the legs 66*a*, 66*b* and may be secured to the legs 66*a*, 66*b* by an adhesive, mechanical fasteners, or any other suitable attachment means. The insert 18 may be made of a metal material and may be manufactured by a stamping process, for example. The insert 18 includes fingers 84 that are configured to grip the structure 14 of the vehicle when a portion of the structure 14 is inserted between the legs 66*a*, 66*b*, thereby securing the retaining structure 16 to the structure 14. In an alternative form (not specifically shown), the legs 66*a*, 66*b* can include fingers similar to fingers 84 but integrally formed with the legs 66*a*, 66*b*.

Returning to the example provided, the retaining structure 16 of the present disclosure includes a plurality of passages extending therethrough in different directions, which allows a band to secure a vehicle component to the retaining structure 16 at various positions. Thus, the retaining structure 16 can accommodate various applications where vehicle components 10 are secured to the vehicle. This reduces the need for multiple retaining structures of a different design to secure vehicle components to the vehicle, which reduces tooling cost and manufacturing cost. It should also be understood that the retaining structure 16 disclosed herein may be used in other applications where two components are secured relative to each other. For example, the retaining structure 16 may be secured to equipment in a manufacturing environment and may secure components such as cables to the equipment.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A retainer for securing an article to an edge of a structure, the retainer comprising:
a body portion defining a first aperture open through a first side of the body portion, a second aperture open through a second side of the body portion, a third aperture open through a third side of the body portion, and a fourth aperture open through a fourth side of the body portion, wherein the first aperture is in communication with the second aperture within the body portion to define a first pathway through the body portion in which a strap is receivable in a first orientation, wherein the third aperture is in communication with the fourth aperture within the body portion to define a second pathway through the body portion in which the strap is receivable in a second orientation, wherein the first pathway and the second pathway are transverse to each other, wherein the body portion further defines a fifth aperture and a sixth aperture in communication with the fifth aperture within the body portion to define a third pathway through the body portion in which the strap is receivable in a third orientation; and
a gripper extending from the first side of the body portion and including a first leg and a second leg, a proximal portion of the first leg and a proximal portion of the second leg being fixed to the body portion, the first and second legs being spaced apart such that the first and second legs cooperate to define a channel, the channel being open through an end of the gripper to receive the edge of the structure,
wherein the body portion defines an interior cavity through which the first, second, and third pathways extend.

2. The retainer according to claim 1, wherein the first, second, and third pathways are transverse to each other.

3. The retainer according to claim 1, wherein the body portion includes at least seven sides.

4. The retainer according to claim 1, wherein the body portion comprises a fourth pathway that is substantially parallel to the first pathway and the second pathway is transverse to the first pathway.

5. The retainer according to claim 1, wherein the first pathway extends in a first direction, the second pathway extends in a second direction, and the third pathway extends in a third direction, wherein the first, second, and third directions are substantially perpendicular to each other.

6. The retainer according to claim 1, wherein a distance between a distal portion of the first leg and a distal portion of the second leg increases such that the channel widens toward the end of the gripper.

7. The retainer according to claim 1, wherein the first, second, third, fourth, fifth, and sixth apertures are each rectangular in shape.

8. The retainer according to claim 1, further comprising the strap.

9. The retainer according to claim 1, wherein the body portion has an L-shape.

10. The retainer according to claim 1, further comprising an insert located within the channel and secured to the first and second legs, the insert configured to grip the edge of the structure.

11. The retainer according to claim 1, wherein the channel and the first pathway extend in the first direction.

12. A retainer for securing an article to an edge of a structure, the retainer comprising:
a body including:
a first body portion including a first aperture open through a first side of the first body portion, a second aperture open through a second side of the first body portion that is opposite the first side, a third aperture open through a third side of the first body portion, and a fourth aperture open through a fourth side of the first body portion that is opposite the third side, wherein the first aperture is in communication with the second aperture to define a first pathway through the first body portion in which a strap is receivable in a first orientation, wherein the third aperture is in communication with the fourth aperture to define a second pathway through the first body portion in which the strap is receivable in a second orientation;
a second body portion extending perpendicular to the first body portion, the second body portion including a fifth aperture open through a fifth side of the second body portion and a sixth aperture open through a sixth side of the second body portion that is opposite the fifth side, the fifth aperture is in communication with the sixth aperture to define a third pathway through the second body portion in which the strap is receivable in a third orientation; and
a gripper extending from the first side of the first body portion and including a first leg and a second leg, a proximal portion of the first leg and a proximal portion of the second leg being fixed to the body portion, the first and second legs being spaced apart and extending in a first direction from the body portion such that the first and second legs cooperate to define a channel, the channel being open through an end of the gripper to receive the edge of the structure,
wherein the first pathway extends in the first direction, the second pathway extends in a second direction, and the third pathway extends in a third direction, the first, second, and third directions are substantially perpendicular to each other, and
wherein the body defines an interior cavity through which the first, second, and third pathways extend.

13. The retainer of claim 12, wherein the first body portion includes a seventh aperture and an eight aperture in communication with the seventh aperture to define a fourth pathway.

14. The retainer of claim 13, wherein the fourth pathway extends in the third direction.

15. The retainer of claim 12, wherein the first body portion includes a seventh aperture open through the second side and the second body portion includes an eight aperture open through a seventh side, the eight aperture in communication with the seventh aperture to define a fourth pathway, the fourth pathway extends in the first direction.

16. The retainer of claim 12, further comprising an insert located within the channel and secured to the first and second legs, the insert configured to grip the edge of the structure.

17. The retainer of claim 16, wherein the body and the gripper are made of a plastic material and the insert is made of a metal material.

18. The retainer of claim 12, further comprising the strap.

19. A retainer for securing an article to an edge of a structure, the retainer comprising:

an L-shaped body portion defining an interior cavity and including a side, a second side, a third side, a fourth side, a fifth side, a sixth side, a seventh side, and an eight side, wherein a plurality of pathways are formed in the body portion and are configured to receive a strap for securing the article to the edge of the structure, the plurality of pathways comprise:

a first pathway extending in a first direction, the first pathway comprising a first aperture open through the first side and a second aperture open through the second side and in communication with the first aperture;

a second pathway extending in the first direction, the second pathway comprising a third aperture open through the third side and a fourth aperture open through the second side and in communication with the third aperture;

a third pathway extending in a second direction that is substantially perpendicular to the first direction, the third pathway comprising a fifth aperture open through the fourth side and a sixth aperture open through the fifth side and in communication with the fifth aperture;

a fourth pathway extending in a third direction that is substantially perpendicular to the first and second directions, the fourth pathway comprising a seventh aperture open through the sixth side and an eighth aperture open through the seventh side and in communication with the seventh aperture; and a fifth pathway extending in the third direction and comprising a ninth aperture open through the sixth side and a tenth aperture open through the seventh side and in communication with the ninth aperture;

a gripper extending from the first side of the body portion and including a first leg and a second leg, a proximal portion of the first leg and a proximal portion of the second leg being fixed to the second side of the body portion, the first and second legs being spaced apart and extending in the first direction from the body portion such that the first and second legs cooperate to define a channel, the channel being open through an end of the gripper to receive the edge of the structure; and an insert located within the channel and secured to the first and second legs, the insert configured to grip the edge of the structure, wherein the body portion defines the interior cavity through which the first, second, and third pathways extend.

* * * * *